United States Patent
Hasegawa

(10) Patent No.: US 10,922,786 B2
(45) Date of Patent: Feb. 16, 2021

(54) IMAGE DIAGNOSIS SUPPORT APPARATUS, METHOD, AND PROGRAM

(71) Applicant: FUJIFILM Corporation, Tokyo (JP)

(72) Inventor: Yu Hasegawa, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 91 days.

(21) Appl. No.: 16/365,254

(22) Filed: Mar. 26, 2019

(65) Prior Publication Data
US 2019/0311462 A1 Oct. 10, 2019

(30) Foreign Application Priority Data
Apr. 6, 2018 (JP) ................................ 2018-074186

(51) Int. Cl.
*G06T 3/40* (2006.01)
*G06N 3/08* (2006.01)
*G06T 7/11* (2017.01)
*G06T 7/174* (2017.01)

(52) U.S. Cl.
CPC ............. *G06T 3/4007* (2013.01); *G06N 3/08* (2013.01); *G06T 7/11* (2017.01); *G06T 7/174* (2017.01); *G06T 2207/10081* (2013.01); *G06T 2207/20084* (2013.01); *G06T 2207/30016* (2013.01)

(58) Field of Classification Search
None
See application file for complete search history.

(56) References Cited

U.S. PATENT DOCUMENTS

| 5,671,157 | A | * | 9/1997 | Saito | ................. | G06T 19/00 345/419 |
| 2009/0041323 | A1 | * | 2/2009 | Lachaine | ............... | G06T 3/4007 382/131 |

FOREIGN PATENT DOCUMENTS

| JP | H10-283496 A | 10/1998 |
| JP | 2014-050465 A | 3/2014 |

OTHER PUBLICATIONS

Lee J, Lee H, Cho S. Sinogram synthesis using convolutional-neural-network for sparsely view-sampled CT. In Medical Imaging 2018: Image Processing Mar. 2, 2018 (vol. 10574, p. 105742A). International Society for Optics and Photonics. (Year: 2018).*

\* cited by examiner

*Primary Examiner* — Vu Le
*Assistant Examiner* — Tracy Mangialaschi
(74) *Attorney, Agent, or Firm* — Studebaker & Brackett PC

(57) ABSTRACT

An interpolation unit generates an interpolation image from an original image. An index value calculation unit calculates an index value indicating the feature of a pixel position in a region of interest of the original image based on pixel values of corresponding pixel positions, which are a plurality of pixel positions of the interpolation image, corresponding to the pixel position included in the region of interest in the original image. A reflection unit reflects the index value calculated by the index value calculation unit at the pixel position of a bleeding region of the original image.

8 Claims, 8 Drawing Sheets

| 0 | $\frac{1}{8}$ | $\frac{7}{8}$ | $\frac{1}{8}$ |
| 0 | $\frac{7}{8}$ | 1 | $\frac{1}{8}$ |
| 0 | 1 | $\frac{3}{8}$ | 0 |
| 0 | $\frac{1}{8}$ | 0 | 0 |

IMAGE DIAGNOSIS SUPPORT APPARATUS, METHOD, AND PROGRAM

CROSS REFERENCE TO RELATED APPLICATIONS

The present application claims priority under 35 U.S.C. § 119 to Japanese Patent Application No. 2018-074186 filed on Apr. 6, 2018. The above application is hereby expressly incorporated by reference, in its entirety, into the present application.

BACKGROUND

Technical Field

The present invention relates to an image diagnosis support apparatus, method, and program for supporting examination of a subject using an image.

Related Art

In recent years, advances in medical apparatuses, such as computed tomography (CT) apparatuses and magnetic resonance imaging (MRI) apparatuses, have enabled image diagnosis using high-resolution medical images with higher quality. In particular, in a case where a target part is a brain, a region causing a vascular disorder, such as cerebral infarction and cerebral hemorrhage, can be specified by image diagnosis using three-dimensional images, such as CT images and MRI images. Therefore, appropriate treatment based on the specified result is performed.

Generally, in a case where cerebral hemorrhage occurs, a bleeding region in a CT image shows a higher CT value than a region other than the bleeding region. Therefore, in image diagnosis using a CT image, the amount of bleeding is calculated by regarding a region showing a high CT value on the CT image as a bleeding region, and examinations of the severity of cerebral hemorrhage, prognosis prediction, and the like are performed. In order to improve the accuracy of the CT image at the time of performing such diagnosis, it is preferable to set the interval between slices forming the CT image as small as possible.

However, in a case where the slice interval is reduced, the imaging time is increased or the amount of exposure of the subject is increased. In addition, in an old CT apparatus and the like, the slice interval may not be able to be reduced. In such a case, since it is difficult to determine whether or not each pixel included in a slice image is a bleeding region, the doctor determines whether or not each pixel included in the slice image is a bleeding region by intuition or experience by referring to slice images of other subjects.

For this reason, a method of improving the slice resolution by interpolating the slices has been proposed. For example, JP1998-283496A (JP-H10-283496A) has proposed a method of generating an interpolation image by interpolating two slice images, binarizing the slice images with a first threshold value, binarizing the interpolation image with a second threshold value different from the first threshold value, and extracting a target region. JP2014-050465A has proposed a method of generating an interpolation image perpendicular to the movement direction of the designated interest point coordinates in a plurality of frames displayed immediately before in the case of sequentially displaying a group of two-dimensional images having a continuous positional relationship.

By using the interpolation image generated from the original image, it is possible to efficiently check the spread of an abnormal portion, such as a lesion, in the subject. However, since the interpolation image is not acquired by actually imaging the tomographic plane corresponding to the interpolation plane in the subject, the interpolation image does not show the actual structure included in the subject. For this reason, accurate examination of the subject cannot be performed by using the interpolation image.

The invention has been made in view of the above circumstances, and it is an object of the invention to accurately and efficiently examine a subject by using an interpolation image generated from an original image.

SUMMARY

An image diagnosis support apparatus according to the invention comprises: an interpolation unit that generates an interpolation image from an original image acquired by imaging a subject; an index value calculation unit that calculates an index value indicating a feature of a pixel position in a region of interest of the original image based on pixel values of corresponding pixel positions, which are a plurality of pixel positions of the interpolation image, corresponding to the pixel position included in the region of interest of the original image; and a reflection unit that reflects the index value at the pixel position in the region of interest of the original image.

In the image diagnosis support apparatus according to the invention, the original image may be a three-dimensional image including a plurality of slice images. The interpolation unit may generate a plurality of interpolation slice images for interpolation between slices of the plurality of slice images as the interpolation images. The index value calculation unit may set a corresponding interpolation slice image corresponding to a target slice image, which is a target of calculation of the index value, in the plurality of interpolation slice images, and calculate an index value indicating a feature of a pixel position in the region of interest of the target slice image based on a pixel value of a corresponding pixel position of the corresponding interpolation slice image corresponding to a pixel position in the region of interest of the target slice image.

The "corresponding interpolation slice image" may be an interpolation slice image within a predetermined range with the target slice image as a reference, or may be all interpolation slice images.

In the image diagnosis support apparatus according to the invention, the index value calculation unit may count the number of pixels of interest that is the number of pixel positions having pixel values indicating the region of interest, among the corresponding pixel positions of the corresponding interpolation slice images, and calculate, as the index value, a value obtained by dividing the number of pixels of interest by the number of corresponding pixel positions of the corresponding interpolation slice images.

In the image diagnosis support apparatus according to the invention, the original image may be a CT image of a brain, and the region of interest may be a bleeding region.

In the image diagnosis support apparatus according to the invention, the original image may be a two-dimensional image. The interpolation unit may generate a two-dimensional interpolation image, which is obtained by interpolation between pixels of the original image, as the interpolation image. The index value calculation unit may set a corresponding interpolation pixel position corresponding to a target pixel position, which is a target of calculation of the index value in the original image, in the two-dimensional interpolation image, and calculate an index value of the target pixel position based on a pixel value of the corresponding interpolation pixel position.

In the image diagnosis support apparatus according to the invention, the interpolation unit may generate the interpolation image using a convolutional neural network learned to output the interpolation image in a case where the original image is input.

In the image diagnosis support apparatus according to the invention, the reflection unit may further generate a reflection image in which the index value is reflected at the pixel position in the region of interest of the original image.

The image diagnosis support apparatus according to the invention may further comprise a display control unit that displays the reflection image on a display unit.

An image diagnosis support method according to the invention comprises: generating an interpolation image from an original image acquired by imaging a subject; calculating an index value indicating a feature of a pixel position in a region of interest of the original image based on pixel values of corresponding pixel positions, which are a plurality of pixel positions of the interpolation image, corresponding to the pixel position included in the region of interest of the original image; and reflecting the index value at the pixel position in the region of interest of the original image.

In addition, a program causing a computer to execute the image diagnosis support method according to the invention may be provided.

Another image diagnosis support apparatus according to the invention comprises: a memory that stores commands to be executed by a computer; and a processor configured to execute the stored commands. The processor executes processing of: generating an interpolation image from an original image acquired by imaging a subject; calculating an index value indicating a feature of a pixel position in a region of interest of the original image based on pixel values of corresponding pixel positions, which are a plurality of pixel positions of the interpolation image, corresponding to the pixel position included in the region of interest of the original image; and reflecting the index value at the pixel position in the region of interest of the original image.

According to the invention, the interpolation image is generated from the original image acquired by imaging the subject, and the index value indicating the feature of the pixel position in the region of interest of the original image is calculated based on the pixel values of the corresponding pixel positions, which are a plurality of pixel positions of the interpolation image, corresponding to the pixel position included in the region of interest in the original image. Then, the index value is reflected at the pixel position in the region of interest of the original image. Therefore, by referring to the index value reflected in the original image, it is possible to efficiently check the spread of an abnormal portion, such as a lesion, in the subject. Therefore, according to the invention, not only the original image but also information obtained from the interpolation image can be referred to. As a result, it is possible to accurately and efficiently examine the subject using the original image.

BRIEF DESCRIPTION OF THE DRAWINGS

FIG. 10 is a diagram showing a calculation result of the index value using a two-dimensional interpolation image shown in FIG. 8.

DETAILED DESCRIPTION

Figure 1:
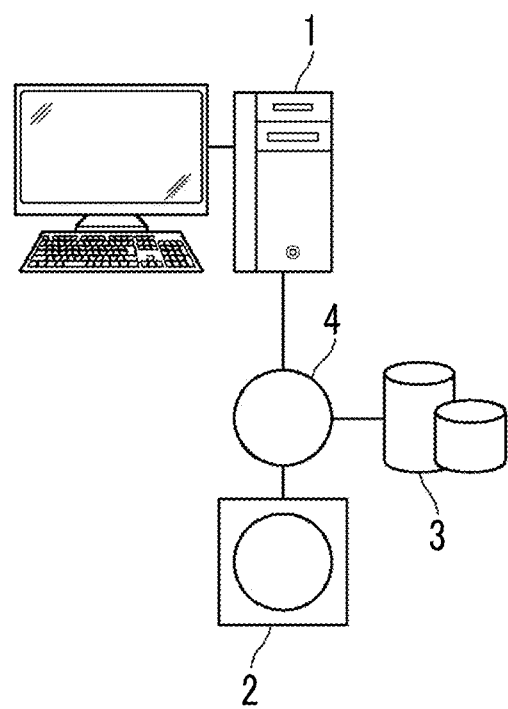
FIG. 1 is a hardware configuration diagram showing the outline of a diagnostic support system to which an image diagnosis support apparatus according to a first embodiment of the invention is applied.

Hereinafter, embodiments of the invention will be described with reference to the accompanying diagrams. FIG. 1 is a hardware configuration diagram showing the outline of a diagnostic support system to which an image diagnosis support apparatus according to a first embodiment of the invention is applied. As shown in FIG. 1, in the diagnostic support system, an image diagnosis support apparatus 1 according to the first embodiment, a three-dimensional image capturing apparatus 2, and an image storage server 3 are communicably connected to each other through a network 4.

The three-dimensional image capturing apparatus 2 is an apparatus that generates a three-dimensional image showing a diagnostic target part of the human body, which is a subject, by imaging the diagnostic target part. Specifically, the three-dimensional image capturing apparatus 2 is a CT apparatus, an MRI apparatus, a positron emission tomography (PET) apparatus, or the like. The three-dimensional image generated by the three-dimensional image capturing apparatus 2 is transmitted to the image storage server 3 and stored therein. In the present embodiment, a diagnostic target part of a patient who is a subject is a brain, the three-dimensional image capturing apparatus 2 is a CT apparatus, and a three-dimensional CT image including the brain of the subject is generated as a three-dimensional image V0. The three-dimensional image V0 includes a plurality of slice images that are images of a plurality of slice planes in the brain. The three-dimensional image V0 corresponds to an original image.

The image storage server 3 is a computer that stores and manages various kinds of data, and comprises a large-capacity external storage device and software for database management. The image storage server 3 communicates with other devices through the wired or wireless network 4 to transmit and receive image data or the like. Specifically, the image storage server 3 acquires various kinds of data including the image data of the three-dimensional image V0, which is generated by the three-dimensional image capturing apparatus 2, through the network, and stores the acquired data in a recording medium, such as a large-capacity external storage device, to manage the acquired data. The storage format of image data and the communication between devices through the network 4 are based on a protocol, such as a digital imaging and communication in medicine (DI-COM).

The image diagnosis support apparatus 1 is realized by installing an image diagnosis support program according to an embodiment of the invention on one computer. The computer may be a workstation or a personal computer that is directly operated by a doctor who performs diagnosis, or may be a server computer connected to these through a network. The image diagnosis support program is distributed by being recorded on a recording medium, such as a digital versatile disc (DVD) or a compact disc read only memory (CD-ROM), and is installed onto the computer from the recording medium. Alternatively, the image diagnosis support program is stored in a storage device of a server computer connected to the network or in a network storage so as to be accessible from the outside, and is downloaded and installed onto a computer used by a doctor as necessary.

Figure 2:
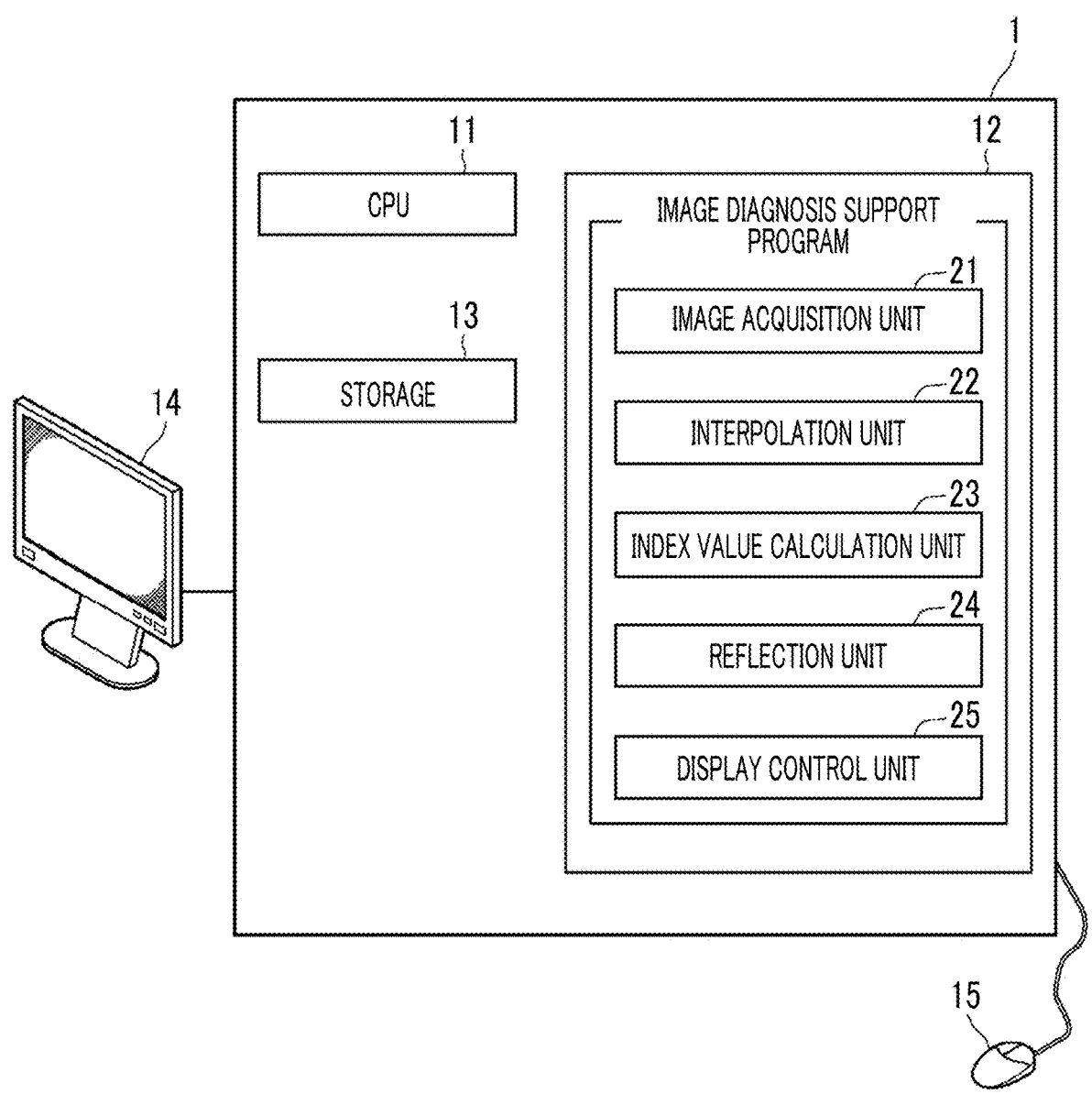
FIG. 2 is a diagram showing the schematic configuration of the image diagnosis support apparatus according to the present embodiment.

FIG. 2 is a diagram showing the schematic configuration of the image diagnosis support apparatus according to the first embodiment that is realized by installing the image diagnosis support program on a computer. As shown in FIG. 2, the image diagnosis support apparatus 1 comprises a central processing unit (CPU) 11, a memory 12, and a storage 13 as the configuration of a standard workstation. A display 14 and an input unit 15, such as a keyboard and a mouse, are connected to the image diagnosis support apparatus 1. The display 14 corresponds to a display unit.

The storage 13 is a hard disk drive or the like. The three-dimensional image V0 acquired from the image storage server 3 through the network 4 and various kinds of information including information necessary for processing are stored in the storage 13.

An image diagnosis support program is stored in the memory 12. As processing to be executed by the CPU 11, the image diagnosis support program defines: image acquisition processing for acquiring the three-dimensional image V0; interpolation processing for generating an interpolation image from the three-dimensional image V0; index value calculation processing for calculating an index value indicating the feature of a pixel position in a region of interest of the three-dimensional image V0 based on pixel values of corresponding pixel positions, which are a plurality of pixel positions of the interpolation image, corresponding to the pixel position included in the region of interest of the three-dimensional image V0; reflection processing for reflecting the index value at the pixel position in the region of interest of the original image; and display control processing for displaying a reflection image, in which the index value is reflected at the pixel position in the region of interest of the three-dimensional image V0, on the display 14.

Then, the CPU 11 executes these processes according to the program, so that the computer functions as an image acquisition unit 21, an interpolation unit 22, an index value calculation unit 23, a reflection unit 24, and a display control unit 25. In the present embodiment, the CPU 11 executes the function of each unit according to the image diagnosis support program. However, as a general-purpose processor that executes software to function as various processing units, a programmable logic device (PLD) that is a processor whose circuit configuration can be changed after manufacturing, such as a field programmable gate array (FPGA), can be used in addition to the CPU 11. Alternatively, the processing of each unit may also be executed by a dedicated electric circuit that is a processor having a circuit configuration designed exclusively to execute specific processing, such as an application specific integrated circuit (ASIC).

One processing unit may be configured by one of various processors, or may be a combination of two or more processors of the same type or different types (for example, a combination of a plurality of FPGAs or a combination of a CPU and an FPGA). Alternatively, a plurality of processing units may be configured by one processor. As an example of configuring a plurality of processing units using one processor, first, as represented by a computer, such as a client and a server, there is a form in which one processor is configured by a combination of one or more CPUs and software and this processor functions as a plurality of processing units. Second, as represented by a system on chip (SoC) or the like, there is a form of using a processor for realizing the function of the entire system including a plurality of processing units with one integrated circuit (IC) chip. Thus, various processing units are configured by using one or more of the above-described various processors as a hardware structure.

More specifically, the hardware structure of these various processors is an electrical circuit (circuitry) in the form of a combination of circuit elements, such as semiconductor elements.

The image acquisition unit 21 acquires the three-dimensional image V0 of the subject from the image storage server 3. In a case where the three-dimensional image V0 is already stored in the storage 13, the image acquisition unit 21 may acquire the three-dimensional image V0 from the storage 13.

The interpolation unit 22 generates an interpolation image from the three-dimensional image V0. In the first embodiment, the three-dimensional image V0 includes a plurality of slice images (hereinafter, referred to as original slice images) Si. The interpolation unit 22 generates a plurality of interpolation slice images Shj for interpolation between the slices of a plurality of original slice images Si. As the processing for generating the interpolation slice image Shj by the interpolation unit 22, for example, an artificial intelligence (AI) technique can be applied. In the present embodiment, the interpolation unit 22 generates the interpolation slice image Shj using a convolutional neural network (hereinafter referred to as CNN) that is one of deep learning algorithms The CNN is learned to output the interpolation slice image Shj in a case where the original slice image Si is input by using teacher data including the original slice image and the interpolation slice image generated using the original slice image.

Figure 3:
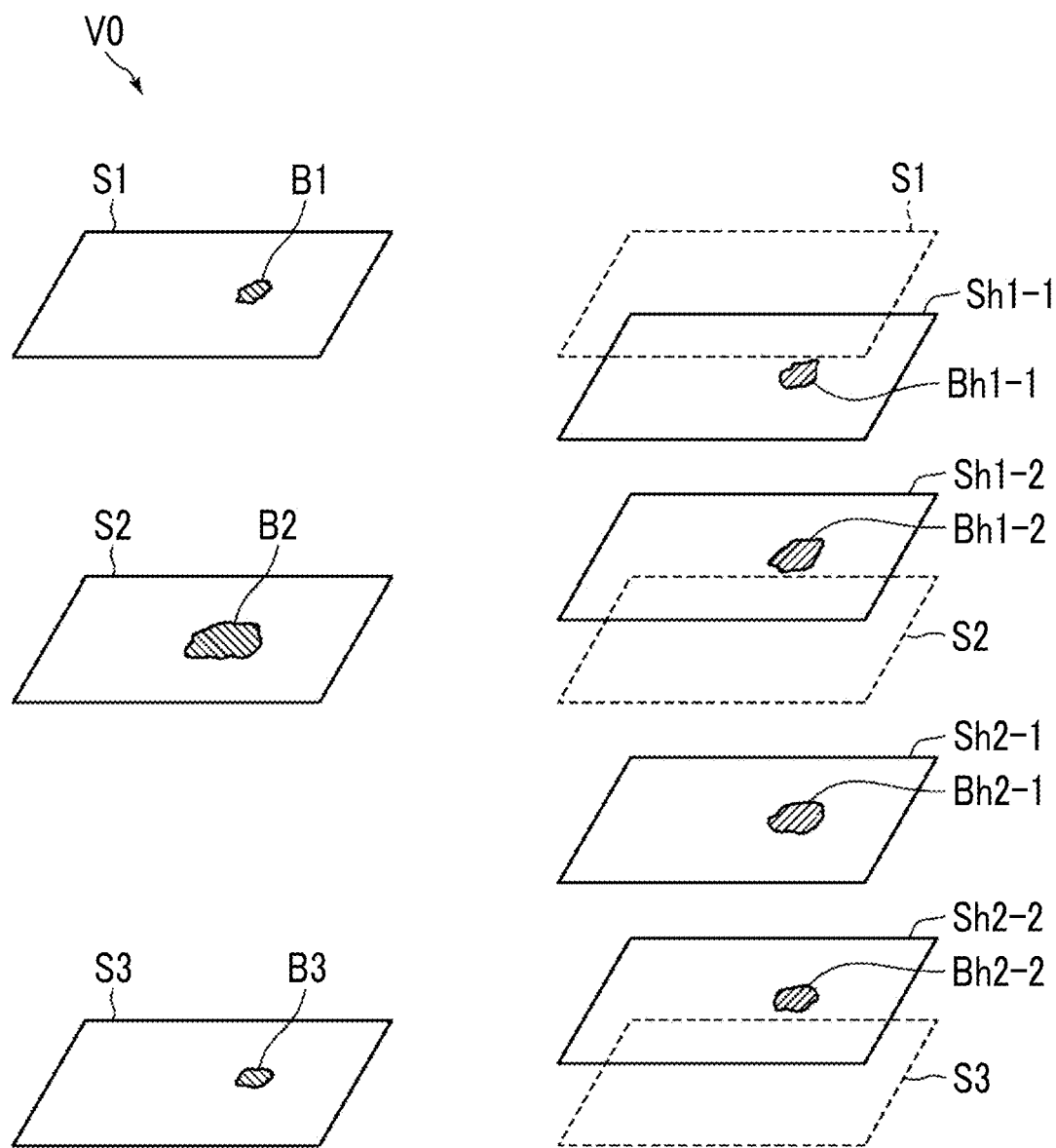
FIG. 3 is a diagram schematically showing the generation of an interpolation slice image.

FIG. 3 is a diagram schematically showing the generation of an interpolation slice image. FIG. 3 shows a state in which the three-dimensional image V0 is configured to include three original slice images S1 to S3 and two interpolation slice images are generated between original slice images. The original slice image S1 includes a bleeding region B1, the original slice image S2 includes a bleeding region B2, and the original slice image S3 includes a bleeding region B3. In addition, since the three-dimensional image V0 is a CT image, the bleeding regions B1 to B3 have higher pixel values than the other regions. As shown in FIG. 3, in a case where the original slice images S1 to S3 are input to the interpolation unit 22, two interpolation slice images Sh1-1 and Sh1-2 for interpolation between the original slice images S1 and S2 are generated. In addition, two interpolation slice images Sh2-1 and Sh2-2 for interpolation between the original slice images S2 and S3 are generated. The interpolation slice images Sh1-1 and Sh1-2 include bleeding regions Bh1-1 and Bh1-2, respectively. The interpolation slice images Sh2-1 and Sh2-2 include bleeding regions Bh2-1 and Bh2-2, respectively.

In addition, the interpolation unit 22 is not limited to one that generates an interpolation slice image using the CNN described above. For example, an interpolation slice image may be generated using an interpolation operation, such as linear interpolation or spline interpolation.

The index value calculation unit 23 calculates an index value indicating the feature of a pixel position in the region of interest of the three-dimensional image V0 based on the pixel values of corresponding pixel positions, which are a plurality of pixel positions of the interpolation slice image, corresponding to the pixel position included in the region of interest of the three-dimensional image V0. Specifically, in the plurality of interpolation slice images, a corresponding interpolation slice image corresponding to the target slice image for which an index value is to be calculated is set. Based on the pixel values of the corresponding pixel positions of the corresponding interpolation slice image corresponding to pixel positions in the region of interest of the target slice image, an index value indicating the feature of a pixel position in the region of interest of the target slice image is calculated.

Figure 4:
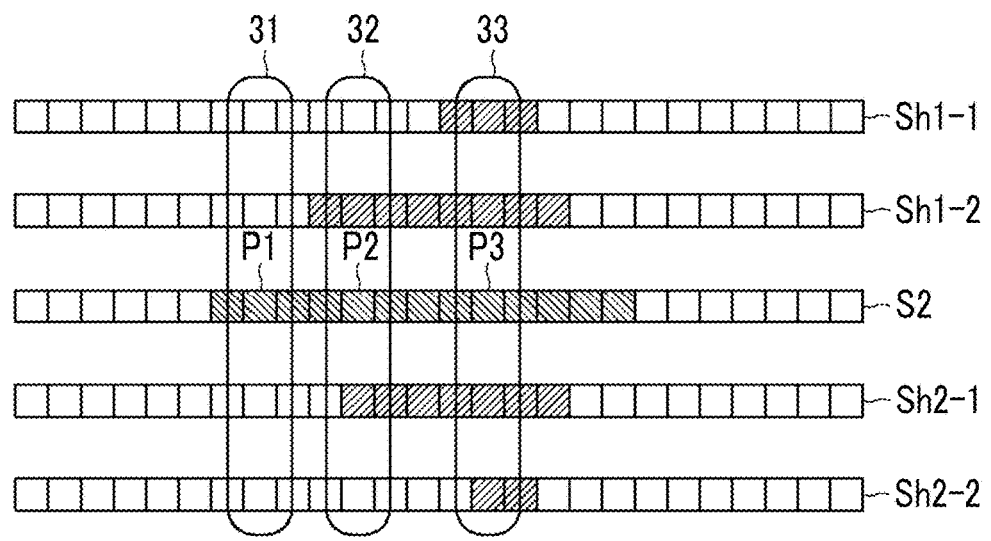
FIG. 4 is a diagram illustrating the calculation of an index value.

Hereinafter, calculation of the index value will be described in detail. Here, it is assumed that the target slice image, which is the target of index value calculation, is the original slice image S2 shown in FIG. 3. In addition, it is assumed that corresponding interpolation slice images corresponding to the target slice image are four interpolation slice images Sh1-1, Sh1-2, Sh2-1, and Sh2-2 shown in FIG. 3. FIG. 4 is a diagram illustrating the calculation of an index value. FIG. 4 schematically shows the target slice image S2 and the interpolation slice images Sh1-1, Sh1-2, Sh2-1, and Sh2-2 that are seen from the side. One square in FIG. 4 indicates each pixel of the target slice image S2 and the interpolation slice images Sh1-1, Sh1-2, Sh2-1, and Sh2-2. Different hatching is given to the bleeding region B2 and the bleeding regions Bh1-1, Bh1-2, Bh2-1, and Bh2-2. In FIG. 4, the pixel positions of the interpolation slice images Sh1-1, Sh1-2, Sh2-1, and Sh2-2 located above and below the pixel position of the target slice image S2 are corresponding pixel positions.

In the first embodiment, the index value calculation unit 23 counts the number of pixels of interest that is the number of pixel positions having pixel values indicating a region of interest, that is, a bleeding region, among the corresponding pixel positions of the corresponding interpolation slice images, and calculates, as an index value, a value obtained by dividing the number of pixels of interest by the number of corresponding pixel positions of the corresponding interpolation slice images. For example, for a pixel position P1 in the bleeding region B2 of the target slice image S2, corresponding pixel positions (pixel positions surrounded by a line 31 in FIG. 4) in the interpolation slice images Sh1-1, Sh1-2, Sh2-1, and Sh2-2 corresponding to the pixel position P1 are not in the bleeding region. Therefore, the number of pixels of interest is 0, and the index value that is a value obtained by dividing the number of pixels of interest by the number of corresponding pixel positions (in the present embodiment, 4) of the corresponding interpolation slice images is 0.

In addition, for a pixel position P2 in the bleeding region B2 of the target slice image S2, corresponding pixel positions of the interpolation slice images Sh1-2 and Sh2-1, among the corresponding pixel positions (pixel positions surrounded by a line 32 in FIG. 4) in the interpolation slice images Sh1-1, Sh1-2, Sh2-1, and Sh2-2 corresponding to the pixel position P2, are in the bleeding region. Therefore, the number of pixels of interest is 2, and the index value is 2/4 (=1/2).

For a pixel position P3 in the bleeding region B2 of the target slice image S2, corresponding pixel positions (pixel positions surrounded by a line 33 in FIG. 4) in the interpolation slice images Sh1-1, Sh1-2, Sh2-1, and Sh2-2 corresponding to the pixel position P3 are all in the bleeding region. Therefore, the number of pixels of interest is 4, and the index value is 4/4 (=1).

The index value calculation unit 23 calculates an index value at the pixel position included in the bleeding region of the original slice image Si as described above.

Figure 5:
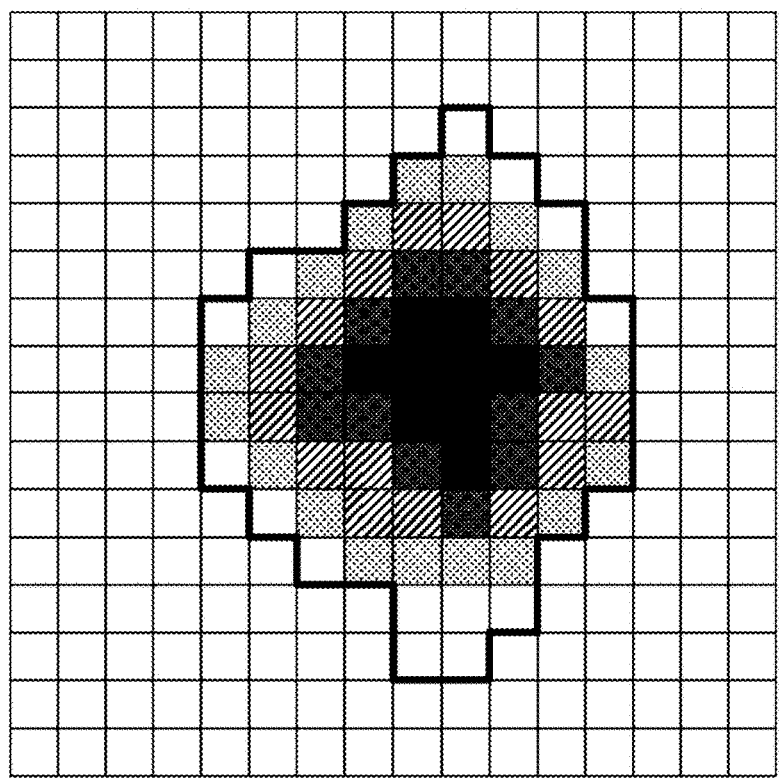
FIG. 5 is a diagram showing an example of a reflection image.

The reflection unit 24 reflects the index value calculated by the index value calculation unit 23 at the pixel position of the bleeding region of the original slice image Si. Specifically, a reflection image Ri is generated in which the index value is reflected at the pixel position in the bleeding region of the original slice image Si. FIG. 5 is a diagram showing an example of a reflection image. FIG. 5 schematically shows a reflection image R2 for the original slice image S2 shown in FIG. 4. In FIG. 4, a square indicates a pixel position. In the reflection image R2, values that the index value can take are 0, 1/4, 2/4 (=1/2), 3/4, and 1. For this reason, in FIG. 5, no pattern is given for a pixel value whose index value is 0, and different patterns are given at pixel positions with index values of 1/4, 2/4 (=1/2), 3/4, and 1.

Figure 6:
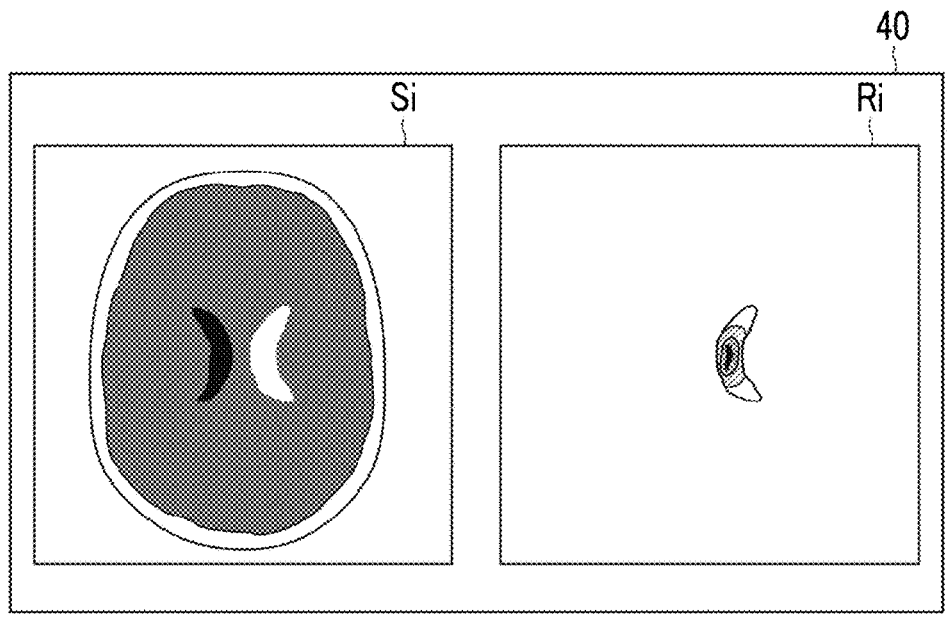
FIG. 6 is a diagram showing a display screen of a reflection image.

The display control unit 25 displays the reflection image Ri on the display 14. FIG. 6 is a diagram showing a display screen of a reflection image. As shown in FIG. 6, the reflection image Ri and the original slice image Si corresponding to the reflection image Ri are displayed on a display screen 40 of the display 14. In FIG. 6, the index value is shown in four stages in order to facilitate illustration. The operator can switch the slice plane to be displayed using the input unit 15. As a result, the display control unit 25 switches the slice planes of the original slice image Si and the reflection image Ri in synchronization with each other.

Figure 7:
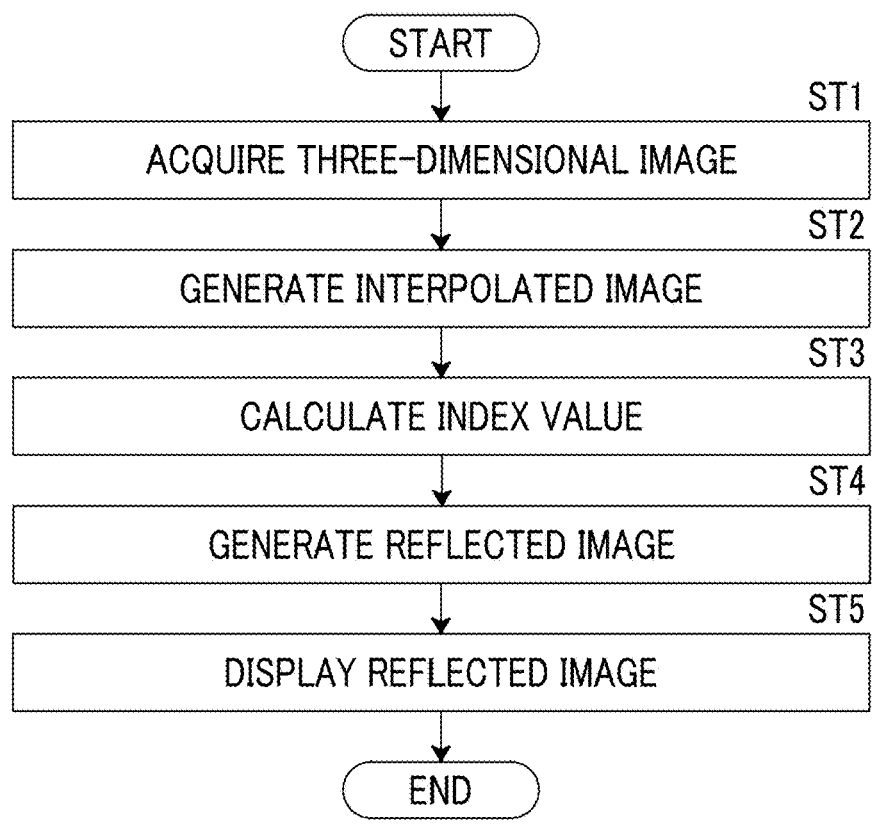
FIG. 7 is a flowchart showing the process performed at the time of learning in the first embodiment.

Next, the process performed in the first embodiment will be described. FIG. 7 is a flowchart showing the process performed in the first embodiment. First, the image acquisition unit 21 acquires the three-dimensional image V0 (step ST1), and the interpolation unit 22 generates an interpolation image from the three-dimensional image V0 (step ST2). Then, the index value calculation unit 23 calculates an index value indicating the feature of a pixel position in the region of interest of the three-dimensional image V0 based on the pixel values of corresponding pixel positions, which are a plurality of pixel positions of the interpolation slice image, corresponding to the pixel position included in the region of interest of the three-dimensional image V0 (step ST3). Then, the reflection unit 24 generates the reflection image Ri by reflecting the index value calculated by the index value calculation unit 23 at the pixel position of the bleeding region of the original slice image Si (step ST4). Then, the display control unit 25 displays the reflection image Ri on the display 14 (step ST5), and the process is ended.

As described above, in the present embodiment, the index value indicating the feature of the pixel position in the region of interest of the three-dimensional image V0 is calculated, and the index value is reflected at the pixel position in the region of interest of the three-dimensional image V0. Therefore, by referring to the index value reflected on the three-dimensional image V0, it is possible to efficiently check the spread of an abnormal portion, such as a lesion, in the subject. Therefore, according to the present embodiment, not only the three-dimensional image V0 but also information obtained from the interpolation slice image can be referred to. As a result, it is possible to accurately and efficiently examine the subject using the three-dimensional image V0.

In the first embodiment described above, two interpolation slice images above the target slice image and two interpolation slice images below the target slice image are used as corresponding interpolation slice images. However, the invention is not limited thereto, and one interpolation slice image above the target slice image and one interpolation slice image below the target slice image may be used as corresponding interpolation slice images. Alternatively, three or more interpolation slice images above the target slice image and three or more interpolation slice images below the target slice image may be used as corresponding interpolation slice images. Alternatively, all the interpolation slice images may be used as corresponding interpolation slice images.

Next, a second embodiment of the invention will be described. In the first embodiment described above, the three-dimensional image V0 is used as an original image of the embodiment of the invention. However, in the second embodiment, a two-dimensional image is used as an original image unlike in the first embodiment. The configuration of an image diagnosis support apparatus according to the second embodiment is the same as the configuration of the image diagnosis support apparatus according to the first embodiment shown in FIG. 2, and only the processing to be performed is different. Accordingly, the detailed description of the apparatus will be omitted herein. In addition, one original slice image forming the three-dimensional image V0 in the first embodiment is used as a two-dimensional image, but the invention is not limited thereto.

Figure 8:
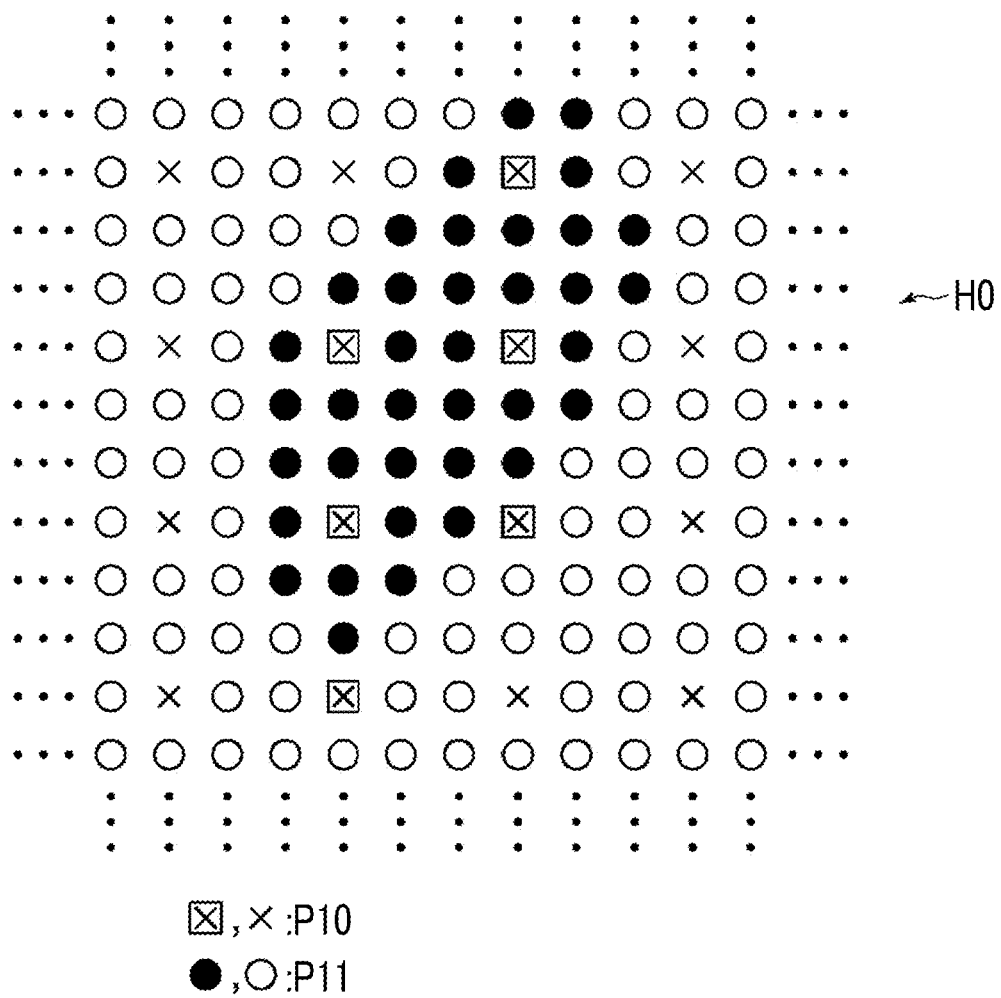
FIG. 8 is a diagram illustrating the generation of a two-dimensional interpolation image in a second embodiment.

In the second embodiment, the interpolation unit 22 generates a two-dimensional interpolation image for interpolation between the pixels of a two-dimensional image. Specifically, the interpolation unit 22 generates a two-dimensional interpolation image having a higher resolution than the two-dimensional image by further interpolating the pixel position between the pixel positions in the two-dimensional image. FIG. 8 is a diagram illustrating the generation of a two-dimensional interpolation image in the second embodiment. As shown in FIG. 8, in the second embodiment, a two-dimensional interpolation image H0 is generated by interpolating interpolation pixel positions P11 between pixel positions P10 (indicated by an x mark in FIG. 8) forming a two-dimensional image so that the resolution of the two-dimensional interpolation image becomes three times the resolution of the two-dimensional image. Here, also in the second embodiment, the region of interest is a bleeding region. In FIG. 8, for the pixel position P10 included in the bleeding region, a square mark is given to x. In addition, the interpolation pixel position P11 having a pixel value indicating a bleeding region is indicated by a black circle, and the interpolation pixel position P11 not having a pixel value indicating a bleeding region is indicated by a white circle.

Also in the second embodiment, the interpolation unit 22 generates the two-dimensional interpolation image H0 by CNN. In this case, the CNN is learned using teacher data including the two-dimensional image and the two-dimensional interpolation image generated using the two-dimensional image. In addition, also in the second embodiment, the interpolation unit 22 is not limited to one that generates the two-dimensional interpolation image H0 using the CNN described above. However, the two-dimensional interpolation image H0 may be generated using an interpolation operation, such as linear interpolation or spline interpolation.

Figure 9:
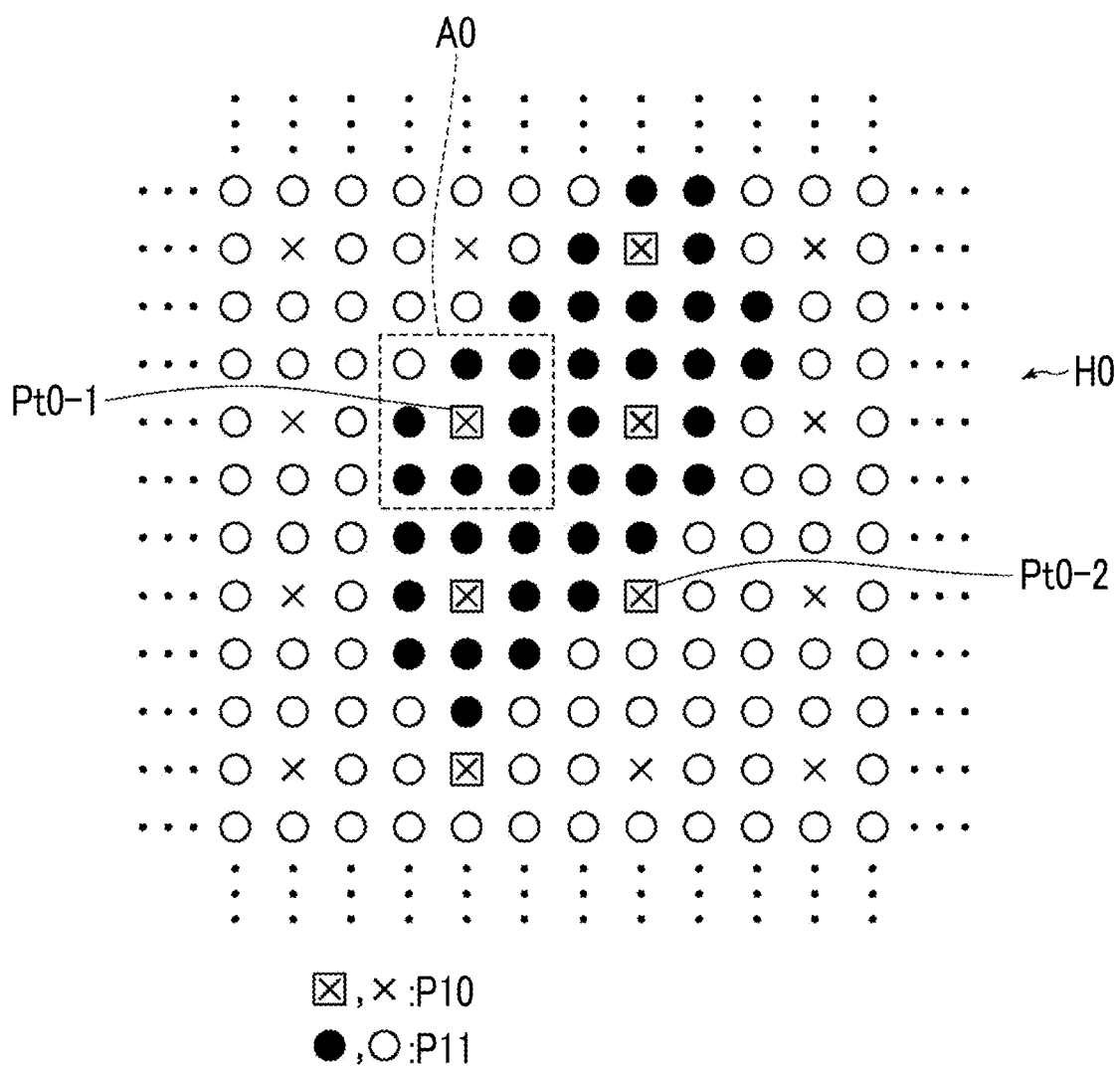
FIG. 9 is a diagram illustrating the calculation of an index value in the second embodiment.

In the second embodiment, the index value calculation unit 23 sets corresponding interpolation pixel positions corresponding to a target pixel position, which is an index value calculation target in the two-dimensional image, in the two-dimensional interpolation image H0, and calculates an index value of the target pixel position based on the pixel values of the corresponding interpolation pixel positions. FIG. 9 is a diagram illustrating the calculation of an index value in the second embodiment. In the second embodiment, first, the index value calculation unit 23 sets corresponding interpolation pixel positions corresponding to the target pixel position that is an index value calculation target. In the second embodiment, the corresponding interpolation pixel positions are eight interpolation pixel positions P11 included in the region of 3×3 pixels having a target pixel position Pt0-1 at its center. However, the invention is not limited thereto. FIG. 9 shows a state in which a region A0 of 3×3 pixels having the target pixel position Pt0-1 at its center is set. Eight interpolation pixel positions P11 in the region A0 are corresponding interpolation pixel positions.

The index value calculation unit 23 counts the number of pixels of interest having pixel values indicating a region of interest, that is, a bleeding region, among the corresponding interpolation pixel positions, and calculates, as an index value, a value obtained by dividing the number of pixels of interest by the number of corresponding interpolation pixel positions. For example, for the target pixel position Pt0-1 shown in FIG. 9, the number of pixels of interest having pixel values indicating a bleeding region among the corresponding interpolation pixel positions is seven. Therefore, the number of pixels of interest is 7, and the index value that is a value obtained by dividing the number of pixels of interest by the number of corresponding interpolation pixel positions (in the present embodiment, 8) is ⅞. In addition, for a target pixel position Pt0-2 shown in FIG. 9, the number of pixels of interest having pixel values indicating a bleeding region among the corresponding interpolation pixel positions is three. Therefore, the number of pixels of interest is 3, and the index value that is a value obtained by dividing the number of pixels of interest by the number of corresponding interpolation pixel positions (in the present embodiment, 8) is ⅜.

The index value calculation unit 23 calculates an index value at the pixel position included in the bleeding region of the two-dimensional image as described above. FIG. 10 is a diagram showing a calculation result of the index value using the interpolation image shown in FIG. 8. In addition, FIG. 10 shows only the index value at the pixel position P10 forming a two-dimensional image.

In the second embodiment, the reflection unit 24 reflects the index value calculated by the index value calculation unit 23 at the pixel position of the bleeding region of the two-dimensional image. That is, the reflection unit 24 generates a reflection image in which the index value is reflected at the pixel position of the two-dimensional image. In the second embodiment, since the index value takes values of 0, ⅛, 2/8, ⅜, 4/8, ⅝, 6/8, ⅞, and 1, the pixel value of the reflection image has nine values corresponding to the values of the index value.

In each of the embodiments described above, the three-dimensional image V0 and the two-dimensional image are targets. However, a four-dimensional image may be a target. The four-dimensional image is an image reflecting a temporal change with respect to the three-dimensional image, that is, a moving image in which a plurality of three-dimensional images are arranged at a predetermined frame rate. Therefore, it is possible to generate a four-dimensional reflection image by generating reflection images by calculating the index value in the same manner as in the first embodiment described above for three-dimensional images forming the four-dimensional image and arranging the generated reflection images at the predetermined frame rate.

In each of the embodiments described above, the bleeding region of the brain is used as a region of interest. However, an infarcted region may be used as a region of interest. Here, the bleeding region in the brain is easy to check in the CT image. On the other hand, the infarcted region is easier to check in the MRI image than in the CT image. Therefore, in a case where the infarcted region is also used as a disease region, it is preferable to use the MRI image as the three-dimensional image V0.

In addition, in each of the embodiments described above, the brain of the human body is used as a subject. However, the invention is not limited thereto. For example, other structures, such as the heart, lung, liver, and kidney of the human body, may be used as subjects. The subject is not limited to the human body, and a structure or a building other than the human body may be used as a subject. In this case, a defect such as a crack included in the structure or the building may be used as a region of interest, and a defect of the subject is diagnosed using the image of the subject.

What is claimed is:

1. An image diagnosis support apparatus, comprising:
    a processor configured to:
        generate an interpolation image from an original image acquired by imaging a subject;
        calculate an index value indicating a feature of a pixel position in a region of interest of the original image based on pixel values of corresponding pixel positions, which are a plurality of pixel positions of the interpolation image, corresponding to the pixel position included in the region of interest of the original image; and
        reflect the index value at the pixel position in the region of interest of the original image,
    wherein the original image is a three-dimensional image including a plurality of slice images, and
    the processor is further configured to:
        generate a plurality of interpolation slice images for interpolation between slices of the plurality of slice images as the interpolation images,
        set a corresponding interpolation slice image corresponding to a target slice image, which is a target of calculation of the index value, in the plurality of interpolation slice images, and calculate an index value indicating a feature of a pixel position in the region of interest of the target slice image based on a pixel value of a corresponding pixel position of the corresponding interpolation slice image corresponding to a pixel position in the region of interest of the target slice image, and
        count a number of pixels of interest that is a number of pixel positions having pixel values indicating the region of interest, among the corresponding pixel positions of the corresponding interpolation slice images, and calculate, as the index value, a value obtained by dividing the number of pixels of interest by a number of corresponding pixel positions of the corresponding interpolation slice images.

2. The image diagnosis support apparatus according to claim 1,
    wherein the original image is a CT image of a brain, and the region of interest is a bleeding region.

3. The image diagnosis support apparatus according to claim 1,
    wherein the original image is a two-dimensional image, and
    the processor is further configured to:
        generate a two-dimensional interpolation image, which is obtained by interpolation between pixels of the original image, as the interpolation image, and
        set a corresponding interpolation pixel position corresponding to a target pixel position, which is a target of calculation of the index value in the original image, in the two-dimensional interpolation image, and calculate an index value of the target pixel position based on a pixel value of the corresponding interpolation pixel position.

4. The image diagnosis support apparatus according to claim 1,
    wherein the processor is further configured to generate the interpolation image using a convolutional neural network learned to output the interpolation image in a case where the original image is input.

5. The image diagnosis support apparatus according to claim 1,
    wherein the processor is further configured to generate a reflection image in which the index value is reflected at the pixel position in the region of interest of the original image.

6. The image diagnosis support apparatus according to claim 5,
    wherein the processor is further configured to display the reflection image on a display unit.

7. An image diagnosis support method, comprising:
    generating an interpolation image from an original image acquired by imaging a subject;
    calculating an index value indicating a feature of a pixel position in a region of interest of the original image based on pixel values of corresponding pixel positions, which are a plurality of pixel positions of the interpolation image, corresponding to the pixel position included in the region of interest of the original image; and
    reflecting the index value at the pixel position in the region of interest of the original image,
    wherein the original image is a three-dimensional image including a plurality of slice images, and
    the method further comprises:
        generating a plurality of interpolation slice images for interpolation between slices of the plurality of slice images as the interpolation images,
        setting a corresponding interpolation slice image corresponding to a target slice image, which is a target of calculation of the index value, in the plurality of interpolation slice images, and calculating an index value indicating a feature of a pixel position in the region of interest of the target slice image based on a pixel value of a corresponding pixel position of the corresponding interpolation slice image corresponding to a pixel position in the region of interest of the target slice image, and
        counting a number of pixels of interest that is a number of pixel positions having pixel values indicating the region of interest, among the corresponding pixel positions of the corresponding interpolation slice images, and calculating, as the index value, a value obtained by dividing the number of pixels of interest by a number of corresponding pixel positions of the corresponding interpolation slice images.

8. A non-transitory computer-readable storage medium that stores an image diagnosis support program causing a computer to execute:
- a step of generating an interpolation image from an original image acquired by imaging a subject;
- a step of calculating an index value indicating a feature of a pixel position in a region of interest of the original image based on pixel values of corresponding pixel positions, which are a plurality of pixel positions of the interpolation image, corresponding to the pixel position included in the region of interest of the original image; and
- a step of reflecting the index value at the pixel position in the region of interest of the original image, wherein the original image is a three-dimensional image including a plurality of slice images, and the image diagnosis support program further causes the computer to execute:
- a step of generating a plurality of interpolation slice images for interpolation between slices of the plurality of slice images as the interpolation images,
- a step of setting a corresponding interpolation slice image corresponding to a target slice image, which is a target of calculation of the index value, in the plurality of interpolation slice images, and calculating an index value indicating a feature of a pixel position in the region of interest of the target slice image based on a pixel value of a corresponding pixel position of the corresponding interpolation slice image corresponding to a pixel position in the region of interest of the target slice image, and
- a step of counting a number of pixels of interest that is a number of pixel positions having pixel values indicating the region of interest, among the corresponding pixel positions of the corresponding interpolation slice images, and calculating, as the index value, a value obtained by dividing the number of pixels of interest by a number of corresponding pixel positions of the corresponding interpolation slice images.

* * * * *